A. L. SCHRAM.
DROP FEEDING DEVICE FOR GLASS MACHINES.
APPLICATION FILED AUG. 28, 1915.
1,353,276. Patented Sept. 21, 1920.
5 SHEETS—SHEET 5.
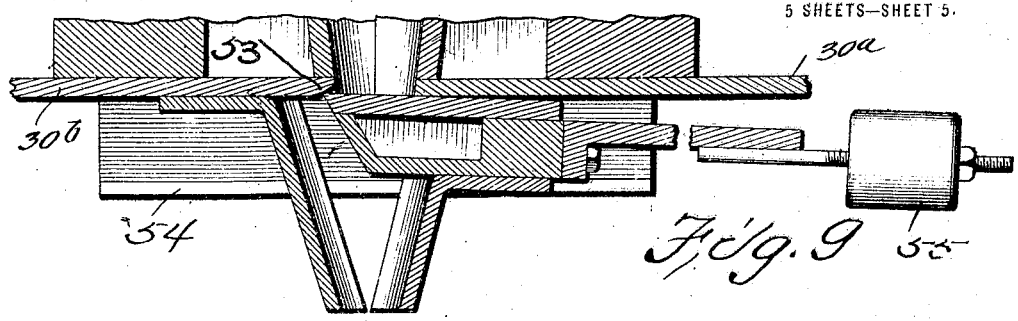
Fig. 9
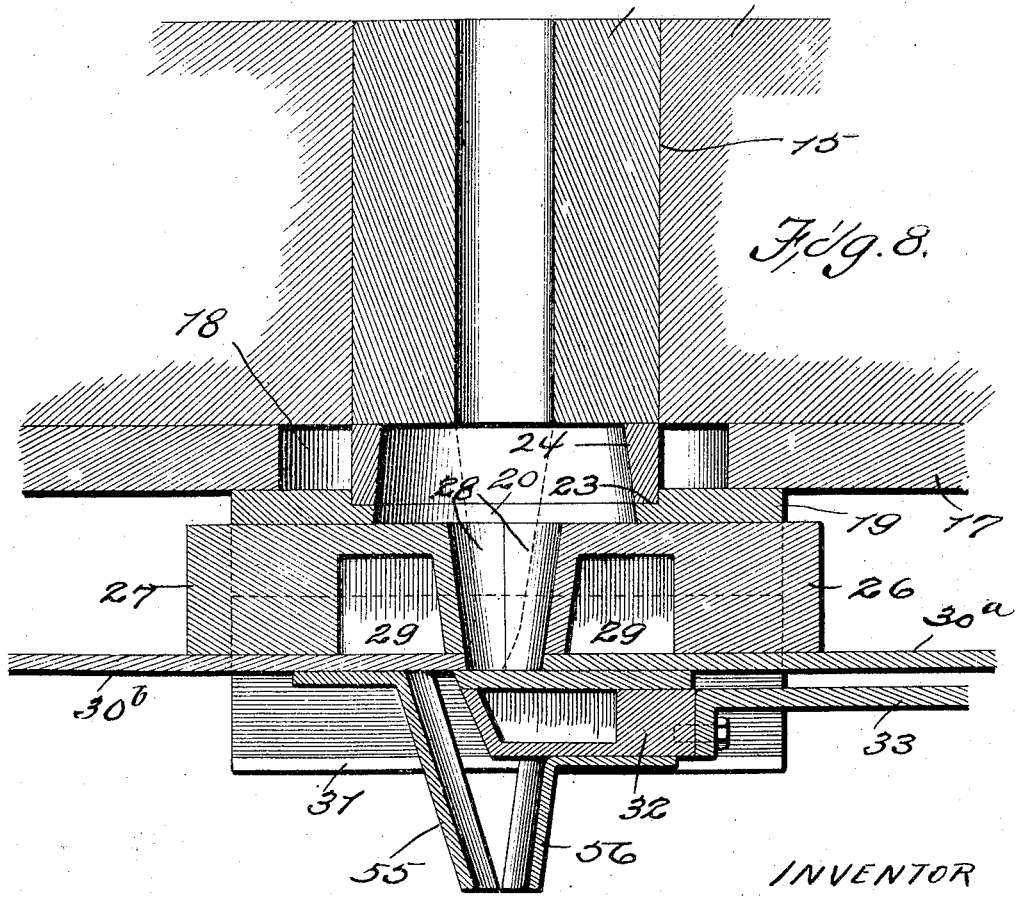
Fig. 8.
INVENTOR
ALEXANDER L. SCHRAM
by Higdon & Longan Attys.

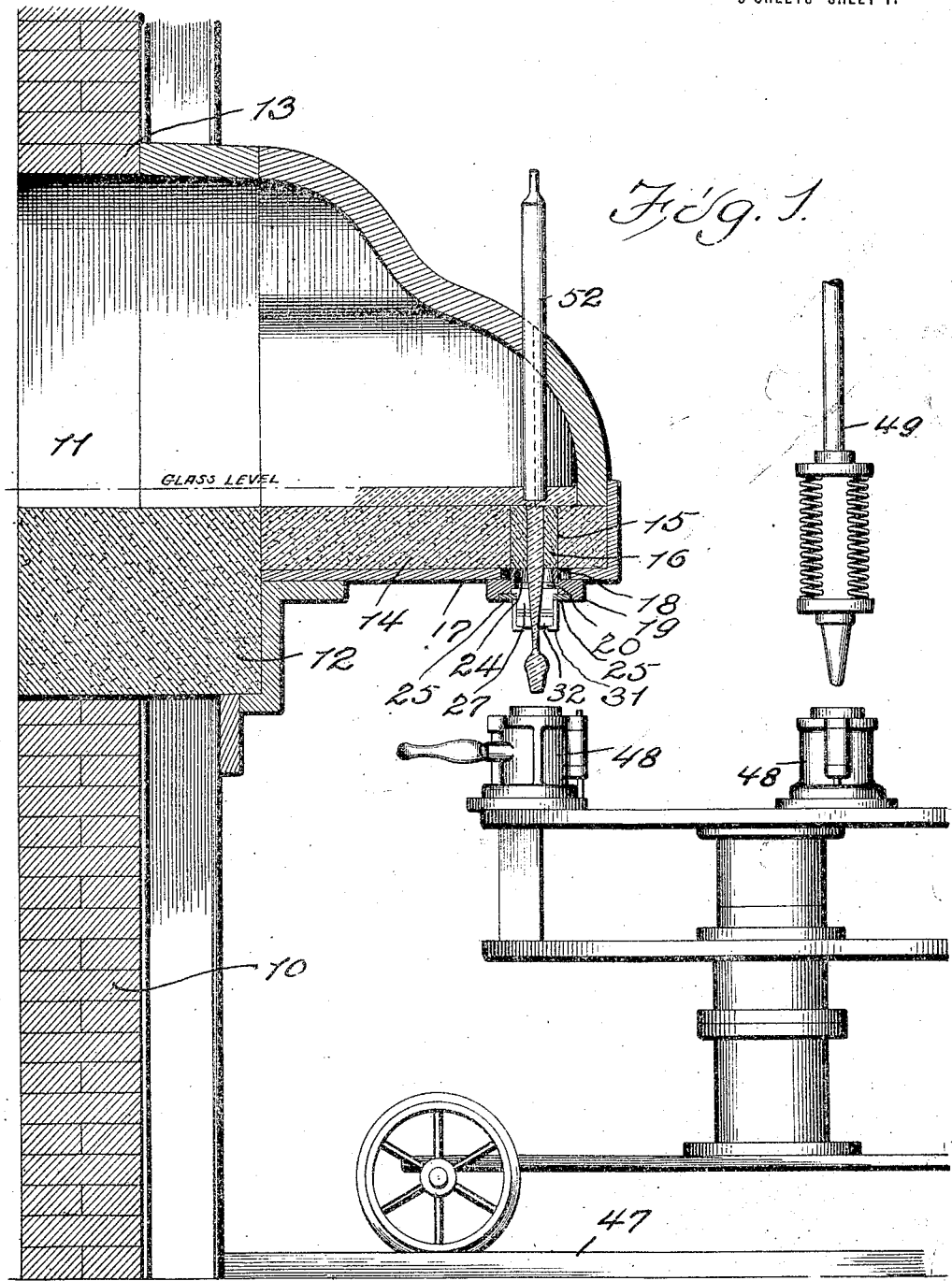

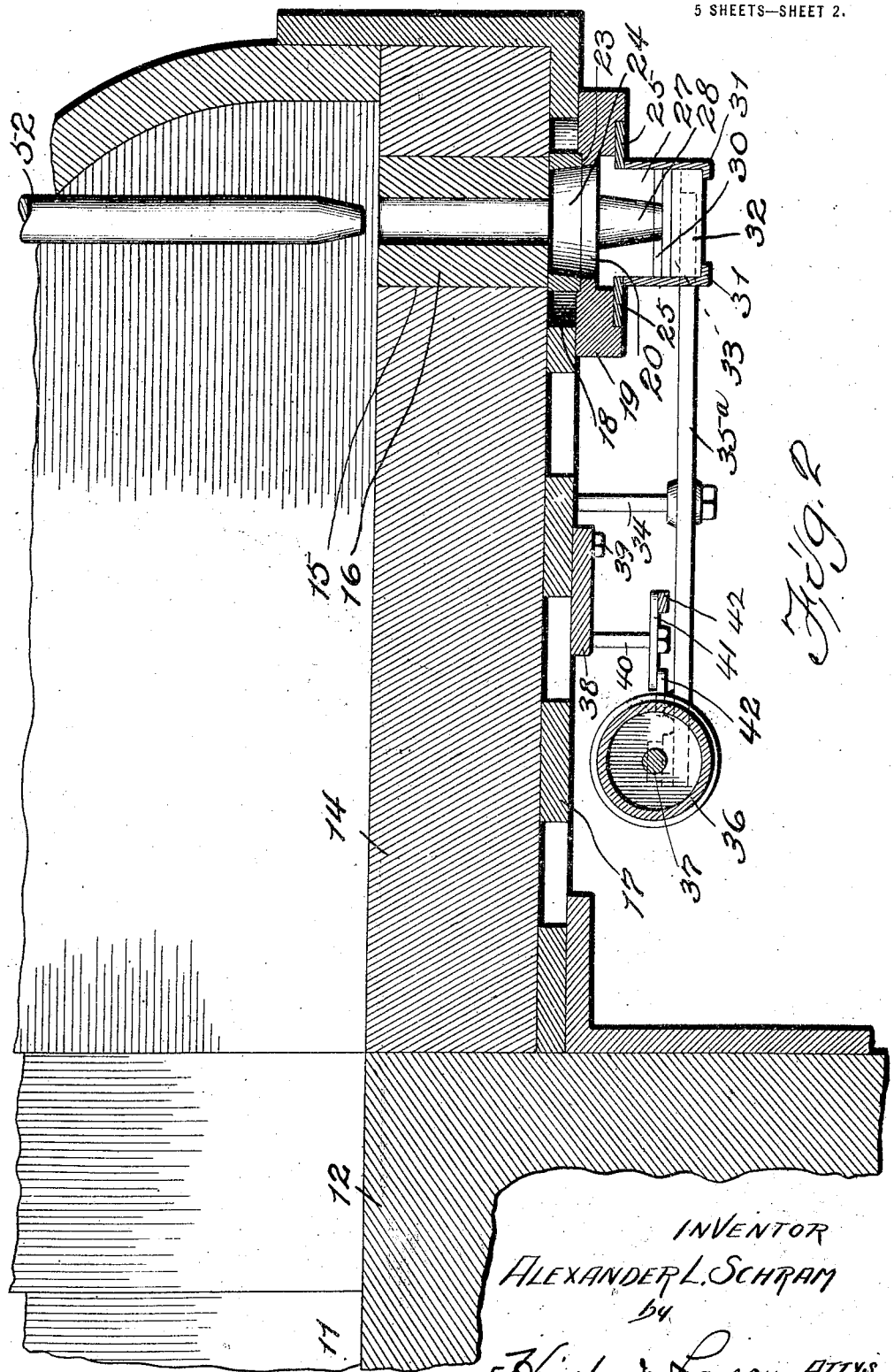

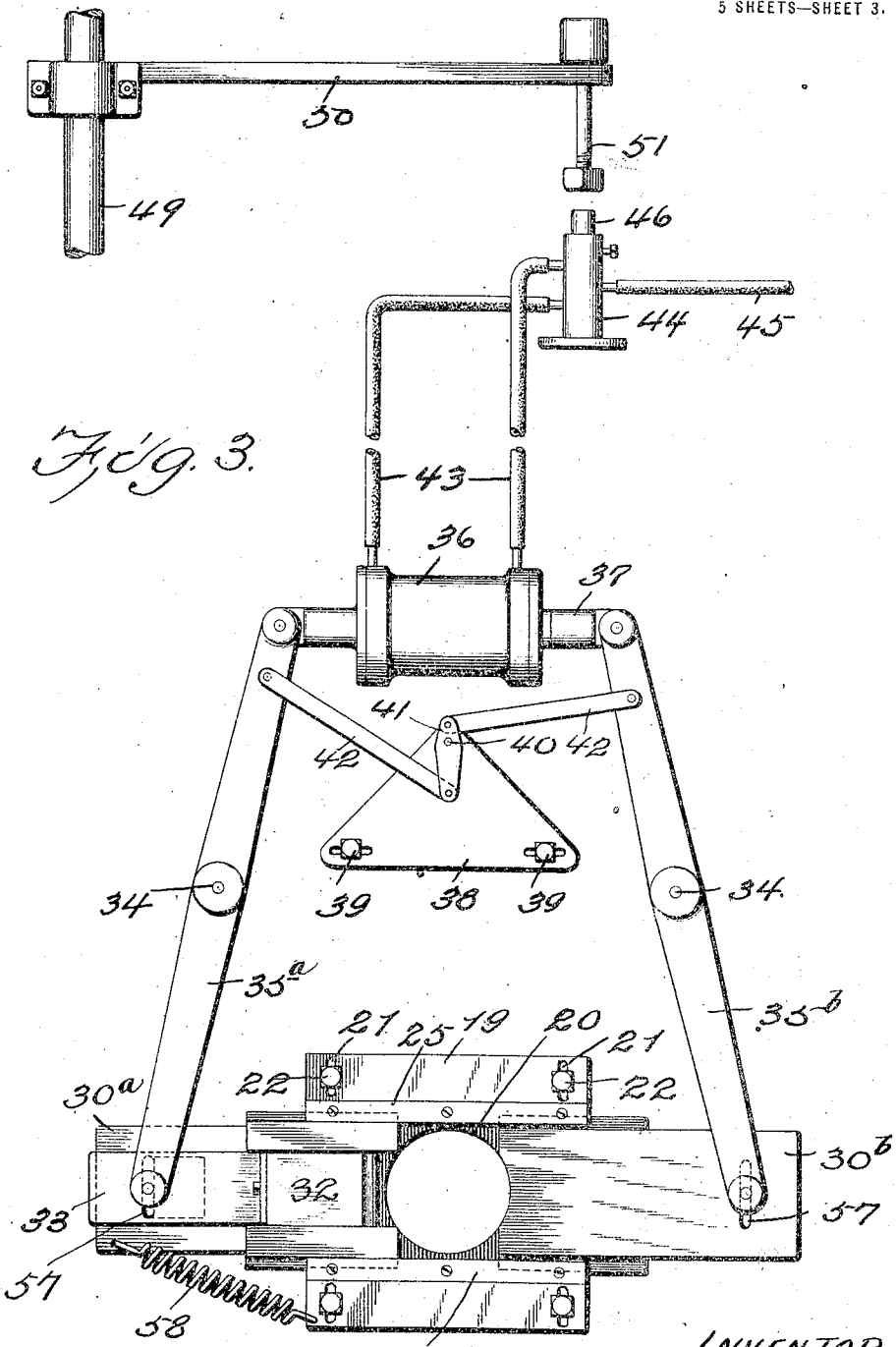

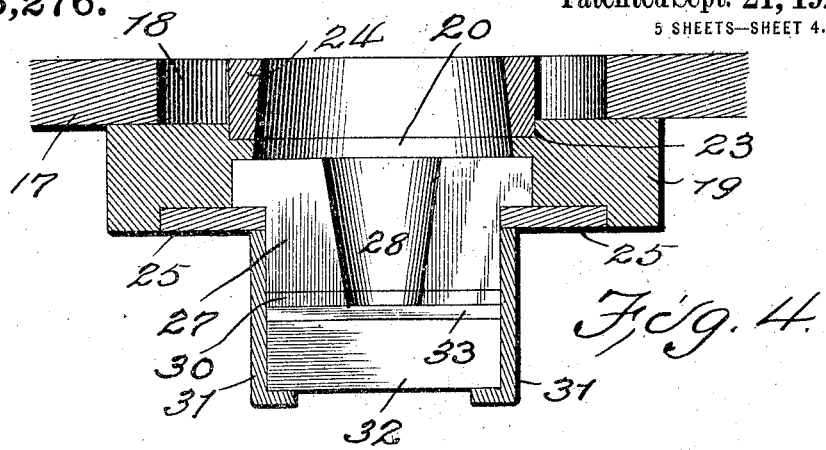
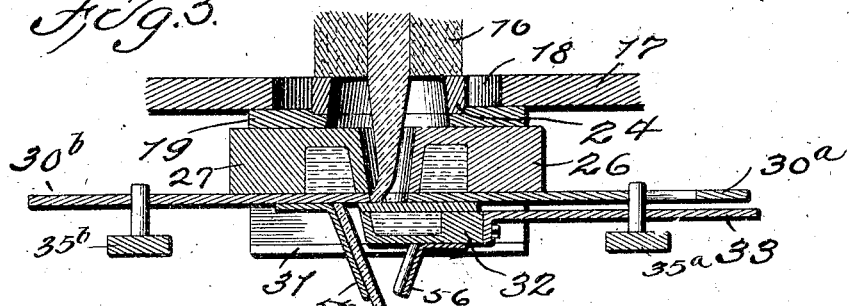
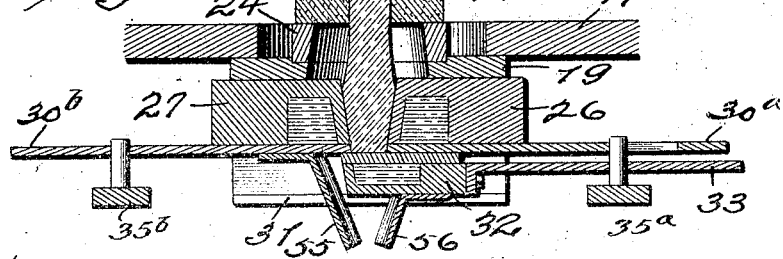
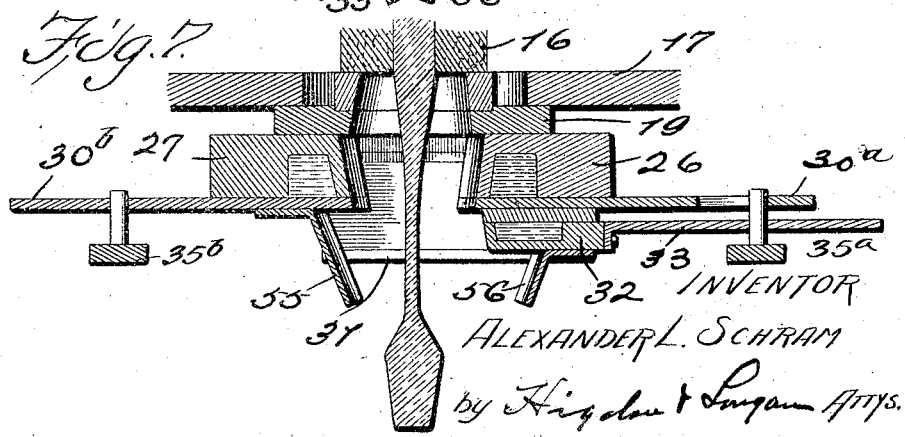

UNITED STATES PATENT OFFICE.

ALEXANDER L. SCHRAM, OF HILLSBORO, ILLINOIS, ASSIGNOR, BY MESNE ASSIGNMENTS, TO DREY AUTOMATIC GLASS MACHINE COMPANY, OF ST. LOUIS, MISSOURI, A CORPORATION OF MISSOURI.

DROP-FEEDING DEVICE FOR GLASS-MACHINES.

1,353,276.  Specification of Letters Patent.  Patented Sept. 21, 1920.

Application filed August 28, 1915. Serial No. 47,719.

*To all whom it may concern:*

Be it known that I, ALEXANDER L. SCHRAM, a citizen of the United States, and resident of Hillsboro, Montgomery county, Illinois, have invented certain new and useful Improvements in Drop-Feeding Devices for Glass-Machines, of which the following is a specification containing a full, clear, and exact description, reference being had to the accompanying drawings, forming a part hereof.

My invention relates to improvements in drop feeding devices for glass machines, wherein partible cup elements and a cutting element conjunctively operate, with a chamber beneath a discharge orifice, to collect and support a batch of glass, flowing from the discharge orifice, in the chamber and free from the sides thereof, release the collected batch and then sever it from the stream flowing from the orifice.

The object of my improvements is to construct a means for collecting a batch of glass from a stream flowing from the discharge orifice of a furnace and supporting the batch in a heated chamber with its major body portion free from contact with the chamber and a knife for severing the batch from the stream by a clean shear cut whereby to minimize contact with the batch by the gathering means and to obviate irregularities of the batch at its points of cutting or severing from the stream to the end that ware or articles are produced clear and free from checks or markings.

My invention consists in the arrangement and combination of parts hereinafter fully described, pointed out in my claims and illustrated by the accompanying drawings, in which—

Figure 1 shows in vertical section a portion of a glass furnace and its extension for discharging glass and a portion of a glass forming machine;

Fig. 2 is an enlarged fragmental, sectional elevation of the glass discharging extension of the furnace showing my improved glass gathering and cutting mechanism;

Fig. 3 is an inverted plan of the gathering cups and knife, and the pneumatic operating means therefor, and shows in diagram an air control valve and operating arm connected with the glass forming machine;

Fig. 4 is a detail transverse sectional elevation of the glass gathering and cutting elements, taken on a line between the partible gathering elements;

Fig. 5 is a longitudinal, sectional elevation, on a reduced scale, of the gathering and cutting elements at the moment of cutting, showing the attenuated stream end caught in the cup and the tail of the batch being guided as to a mold;

Fig. 6 is a view similar to Fig. 5, with the parts of the apparatus in the same position but showing the batch fully gathered;

Fig. 7 is a view similar to Figs. 5 and 6, but showing the partible cup and knife in an open position and the batch being dropped therefrom as to a mold;

Fig. 8 is an enlarged fragmental longitudinal sectional elevation showing the discharge orifice, its controlling plug and my improved gathering cups and knife; and Fig. 9 is a modified form of knife construction wherein the knife proper is tilted by a gravity weight to hold its cutting edge against its companion edge.

Referring by numerals to the accompanying drawings, 10 designates the glass furnace, a portion only of which is shown, and which is provided in its side wall with an opening 11 having at its bottom and below the glass level of the furnace a base 12 of refractory material and having a lining 13 of refractory material. The base 12 extends laterally beyond the wall of the furnace, and has rested thereagainst a furnace extension 14 constructed of refractory material and through which near its outer end is a discharge opening 15, lined by a removable bushing 16, through which the molten glass flows from the extension.

By preference this extension is supported upon a metallic harness 17 and which has an opening 18 of greater diameter than and in registration with the bushing 16.

Secured to the underneath face of the harness 17 is a head 19, having an opening 20 therethrough, and in order that the head may be adjustably mounted relative to the harness to bring its opening in registration with the harness opening, I provide the head with a number of slots 21 through which the bolts 22 are extended and seated into the harness.

In the upper face of the head around the opening therein I form an annular seat 23 in which I place a metallic ring 24, whose inner perimeter inclines outwardly and downwardly to present a surface least likely to retain a batch of glass in the event the glass reaches the ring as might happen when the cups and knife are momentarily stopped by accident. This ring also constitutes a support for the bushing 16 and forms with the bushing and the head 19 a chamber heated by conduction from the furnace extension in which batches of glass are gathered and through which the molten glass either in the stream flowing from the bushing or in batch form passes without contacting with the sides of said chamber.

On the underneath face of the head I secure the plates 25 in parallel arrangement, one on each side of the opening in the head and which form a trackway for the partible cup elements 26 and 27, each of which consists of a substantially rectangular metal block having in their forward faces concavities 28 which taper inwardly and downwardly and conjointly form a cup to receive and partially hold a gathering of glass.

By preference there is formed in each of the cup elements adjacent the concavities a cavity 29 forming a means to receive water for the cooling of the cup elements. To the cup element 26 there is secured a plate 30ª and to the cup element 27 there is secured a plate 30ᵇ, which plates form the bottoms of the water cavities and which plates have their adjacent margins shaped to conform with the adjacent or concaved faces of the cup elements. Said plates extend outwardly beyond the cup elements for connection with cup operating means hereinafter described.

Paralleling but in planes beneath the plates 25 are the trackways 31 between which is mounted the knife 32 which is water cooled similarly to the cup elements and is provided with an extended plate 33 for its operation. The uppermost forward edge of this knife coöperates with the lowermost inner edge of the cup element 27 to sever the batch of glass from the stream.

Suspended from the metallic harness of the furnace extension by the pivot bolts 34 are the rocking levers 35ª and 35ᵇ, the lever 35ª having its one end connected with the plate 30ª of the cup element 26 and with the plate 33 of the knife 32, and the lever 35ᵇ having its one end connected with the plate 30ᵇ of the cup element 27. The other end of the lever 35ª is connected with a floating cylinder 36 and the same end of the lever 35ᵇ is connected with the stem 37 of a piston operating with the cylinder.

The numeral 38 designates a plate adjustably secured to the harness 17 by means of slots and bolts 39 and depending from the plate is a pin 40 from which I pivotally suspend a lever 41, having arms of unequal lengths. To each of the arms of the lever 41 there is connected a link 42, which serves to connect the long arm of the lever 41 with the lever 35ª and the short arm of the lever 41 with the lever 35ᵇ. Leading from each end of the cylinder is a flexible tube 43 which connects with a valve 44 in communication by means of a tube 45 with a source of compressed air, not shown.

This valve 44 includes a movable part (stem) 46 which alternately operates to supply compressed air to one end of the cylinder and exhaust the other and then supply air to the cylinder end just exhausted and exhaust at the cylinder end first supplied with air.

The valve shown in its specific construction forms no part of my invention and other forms known in the art may be substituted.

On the ground surface leading outwardly from the furnace beneath the extension of the furnace I provide the tracks 47 on which is mounted for movement laterally relative to the furnace a glass forming machine comprising a rotatable carrier supporting article molds 48 and which machine also is provided with a plunger 49 which operates in a manner well known in the art with the molds to form articles.

Connected with this plunger is an arm 50 carrying at its outer end a weighted pin 51 arranged to engage the stem or working part of the air valve. For controlling the volume of glass flowing through the discharge orifice or bushing I employ a plug 52.

In Fig. 9 I illustrate a modified form of glass cutting means wherein the glass gathering cups are constructed and operated identically as in the other form shown and described except that the cutting edge 53 of the one cup is beveled.

The knife is also constructed and operates the same as in the other form shown and described except for the trackway 54 in which it is moved and for the adjustable weight 55 at the outer end of the plate of the knife which connects with the pneumatically operated rocking lever.

The trackway 54 is of slightly greater height than the knife permitting some vertical play of the knife and the weight serves to tilt the knife to cause its cutting edge to be held against the cutting edge of the cup element. The adjustable weight permits of a variable tension between the cutting edges, much after the fashion of shear blades.

In Fig. 6 I show the knife in its cutting position and the severed attenuated end of the batch deflected laterally to a position out of vertical alinement with the mold, and to provide for the conduction of this attenuated batch end into the mold I employ on the cup element 27 having the cutting margin a downwardly and inwardly inclined guide 55 and on the knife 32 a similar guide 56 between which guides the batch end is straightened out and caused to fall vertically into the mold.

The plate 30ᵇ of the cup element 27 having the cutting edge and the plate 33 of the knife 32 each have a transverse slot 57 which provide for arcual movements of the pins connecting the plates and their operating levers, while the plate 30ᵃ connected with the cup element 26, which cup element simply enters into the gathering and has nothing to do with the cutting of the glass, is provided with an opening therethrough whose dimensions permit of the arcual movement of the pin connecting it with its operating lever as well as longitudinal play between the said plate and the operating pin.

From the foregoing description it will be observed that in the gathering operation the cup 26 is first brought to a gathering position and during which operation the cup 27 and knife 32 will continue to move until the severing is completed. In discharging, knife 32 recedes at the same time as cup 27, and cup 26 follows when the end of the slot in plate 30ᵃ is reached.

Having thus described my invention, what I claim as new therein and desire to secure by Letters Patent of the United States therefor, is:

1. In an apparatus of the class described, a controllable discharging means for a glass furnace, a chamber surrounding and of greater cross sectional dimensions than the discharge end of said means, partible gathering devices forming a continuation of said chamber, a glass severing device forming the bottom of said chamber, a glass forming machine and means controlled by the forming machine for operating the gathering and severing devices.

2. In an apparatus of the class described, a glass furnace having a controllable discharge orifice, partible, bottomless cup elements movably mounted beneath the discharge orifice, a glass severing device forming the bottom of the cup comprising said partible elements, a pair of rocking levers for the movement of said cup elements and severing device, a cylinder and piston for rocking said levers, a valve controlled source of fluid supply for said cylinder, a glass forming machine, means carried by one of the movable parts of the forming machine for operating said valve, and means for causing the said severing device to be moved a greater distance than the said cup elements.

3. In an apparatus of the class described, a controllable glass discharging means, means forming a chamber beneath the discharging means and of greater diameter than the orifice thereof, partible and bottomless gathering means beneath said discharging means, a knife forming a bottom for the gathering means, and means for moving the partible gathering means and said knife different lengths of movement, for the purposes stated.

4. In combination with partible cup shaped gathering devices, one of which is provided with a glass severing edge, a knife, a support for the knife permitting vertical play thereof when moved and an adjustable weight acting on the knife to cause its cutting edge to bear against the cutting edge of one of the gathering devices.

5. In an apparatus of the class described, relatively movable glass gathering and severing devices, a pair of rocking levers for the operation of the said devices, a cylinder and piston supported by said levers and a valve controlled source of fluid supply for the operation of said cylinder and piston.

6. In an apparatus of the class described, a pair of partible glass gathering elements, a glass severing device, a pair of rocking levers connected with said elements and device, a cylinder and piston connected with said levers and an equalizing means for causing said cylinder and piston to operate said levers at different speeds and different distances of movement.

7. An apparatus of the class described comprising a glass furnace having a controllable discharge outlet, a chamber surrounding the discharge end of the outlet and having a greater diameter than said outlet, a pair of relatively movable gathering elements and a severing element movably positioned beneath the gathering elements and forming at times with the wall of said chamber a closed extension, a severing margin on one of said gathering elements, means for moving the gathering elements toward and away from each other and means for independently moving the severing element in position to close the extension formed by the gathering elements and the wall of said chamber.

8. In an apparatus of the class described, the combination of a receptacle for molten glass having a controllable discharge outlet, a non-partible chamber surrounding the discharge end of said outlet and of greater diameter than said outlet, a pair of relatively movable gathering elements and a severing element forming at times with the wall of said chamber a closed extension from the discharge outlet, a severing margin on one of said gathering elements, means for moving the gathering elements toward and away from each other independently of the severing element and means for moving the severing element in a position to close the lower end of said extension.

In testimony whereof, I have signed my name to this specification, in presence of two subscribing witnesses.

ALEXANDER L. SCHRAM.

Witnesses:
E. L. WALLACE,
R. G. EWING.